(12) United States Patent
Hurtgam

(10) Patent No.: US 6,804,891 B1
(45) Date of Patent: Oct. 19, 2004

(54) DOOR AND DRAWER PULL JIG

(76) Inventor: Mervin W Hurtgam, 14 Thomas Jefferson La., Amherst, NY (US) 14226

( * ) Notice: Subject to any disclaimer, the term of this patent is extended or adjusted under 35 U.S.C. 154(b) by 0 days.

(21) Appl. No.: 10/660,246

(22) Filed: Sep. 12, 2003

(51) Int. Cl.⁷ .................................................. E04F 21/00
(52) U.S. Cl. ........................................... 33/194; 33/562
(58) Field of Search .......................... 33/562, 563, 566, 33/194

(56) References Cited

U.S. PATENT DOCUMENTS

| | | | |
|---|---|---|---|
| 1,545,424 A | * 7/1925 | Heimrich | 33/562 |
| 4,882,846 A | * 11/1989 | Reed | 33/562 |
| 4,998,355 A | * 3/1991 | Greene | 33/194 |
| 5,762,115 A | * 6/1998 | Shouse | 33/562 |
| 5,890,297 A | * 4/1999 | Frasheski | 33/194 |
| 6,532,674 B2 | * 3/2003 | Farese | 33/194 |
| 6,615,500 B2 | * 9/2003 | Hale et al. | 33/194 |

* cited by examiner

Primary Examiner—Christopher W. Fulton
(74) Attorney, Agent, or Firm—Wallace F. Neyerlin

(57) ABSTRACT

A device which facilitates the efficient and quick installation of pull handles on cabinet doors or drawers, said device comprising two main elements, a base piece and an insert piece, both of which are fabricated from clear transparent plastic, said base piece being about 9 inches long and about 1½ to about 1¾ inch wide with a rectangular longitudinally extending opening about 8 inches long and about ½ inch wide in its center, said base piece also having an alignment edge at one of its ends and at right angle to the rest of said base piece, said edge being about 2 inches wide and about ¾ inch high, said rectangular opening in said base piece being calibrated inch wise and with about ¼ inch interval marks, and said insert piece having means on its bottom surface for snapping into tight connection in the longitudinally extending central opening of said base piece, either lengthwise in said opening or transverse-wise in said opening, and said insert piece having about fifteen, 5/32 inch uniformly spaced diameter holes in same for allowing scribing on the cabinet doors or drawers where the holes for the threaded bolts of the pull handles are to be drilled.

6 Claims, 4 Drawing Sheets

FIG. 2  FIG. 2a  FIG. 2b

DOOR AND DRAWER PULL JIG

BACKGROUND OF THE INVENTION

Field of the Invention

This invention relates to a device useful for assisting in the precise installing of pull handles on doors and drawers, such as on kitchen cabinet doors and drawers.

The handles for pulling open doors and drawers typically may be ornamental in design on the grasping portion of same and installed either vertically or horizontally on the door or drawer. The holes for the threaded bolts for the handles typically may be about 3 inches apart and the grasping portion of the pull handle being spaced about ½ inch to about 1 inch away from the planar surface of the door or drawer after the handle is secured in place by tightening the bolts into threaded recesses of the pull handles.

It is desirable, particularly for the home "do-it-yourselfer" to install these pull handles, as nearly as possible at exactly the same positions on a series of horizontally aligned drawers, or a series of vertically arranged doors for appearance purposes and so that the pull handles don't display sloppy or inefficient workmanship after the threaded bolts have been tightly secured through the drilled holes in the drawers or doors and into the threaded recesses of the grasp handle designed to receive the bolts. However, without accurate and often time-consuming measuring by the home "do-it-yourselfer" it is frequently the case that the installer finds that the grasp handles may be biased away from horizontal or vertical or that the handles may appear unaligned after the bolts for the handles are tightened into place through the walls of the doors or drawers.

SUMMARY OF THE INVENTION

It is an object of this invention to devise a device or jig which facilitates the efficient and quick installation of pull handles on cabinet doors and drawers.

It is another object of this invention to devise a jig that can accomplish the foregoing and that can be used efficiently by the relatively unskilled home "do-it-yourselfer."

It is another object of this invention to devise such a jig that will be relatively inexpensive to manufacture.

It is another object of this invention to devise such a jig as is light in weight to handle and that can be easily placed on doors and drawers so that the pull handle holes can be drilled in proper place so that the pulls can be installed properly.

It is another object to design such a jig that will fit all sizes of drawer and door pulls, such as pull handles whose threaded holes are spaced apart 2.0", 2.5, 3.0, 3.5, 4.0, 4.5 and 5.0, etc. inches.

BRIEF DESCRIPTION OF THE DRAWINGS

FIG. 2 is a front view of the adjustable hole locater insert piece, which piece is designed for flexible position insertion into a central longitudinal opening in the base piece.

FIG. 2a is a side view of the insert piece; FIG. 2b is a bottom view of the insert piece.

DETAILED DESCRIPTION OF THE DRAWINGS AND OF THE PREFERRED EMBODIMENTS

Figures 1, 1A:
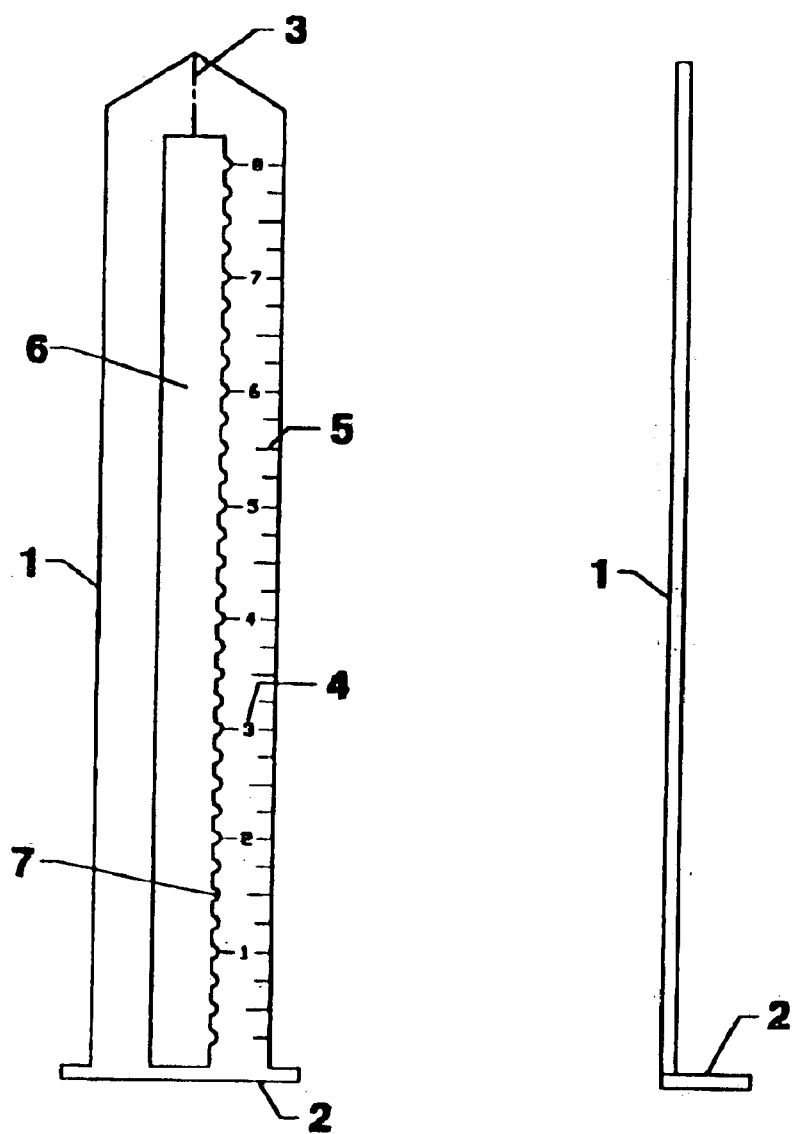
FIG. 1 is a front view of the base of the two-piece door and drawer pull jig or template of the present invention, said base piece functioning as the calibrated holder of the other piece of the jig or template, said other piece being an adjustable hole locater so that it makes proper alignment of the door or drawer pull.
FIG. 1a is a side view of said base piece.

In FIG. 1, numeral 1 designates the main or base piece of the jig. This main piece is preferably fabricated of ⅛ inch thick molded clear acrylic plastic and is about 9 inches long. Numeral 2 designated an alignment edge at the base end of the main piece, said alignment edge being about 2 inches wide and about ¾ inch high and vertical to or at right angle to the rest of the base piece, as shown in FIG. 1a. Numeral 3 designates a center line mark for alignment purposes at the pointed end of the base piece.

The base piece has a calibrated, rectangular shaped longitudinally extending opening 6 in the middle portion of same, said opening being about 8 inches long; numeral 4 meaning to identify each of the 1 through 8 inch numbers and marks and numeral 5 meaning to identify each ¼ inch interval marks at the calibrated edge of the base piece. The longitudinal opening 6 serves as the means for attaching the insert piece into the opening of the base piece, said opening having notches or detents 7 at every ¼ inch space in the longitudinal opening, said detents being needed for locking the insert piece in place.

Figure 1B:
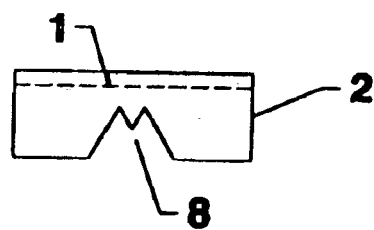
FIG. 1b is an end view of the bottom end of the base piece.

In FIG. 1b, numeral 8 in the alignment edge 2 designates a notch for center line alignment with the cabinet piece being worked on for the installation of the pull handle.

Figure 2C:
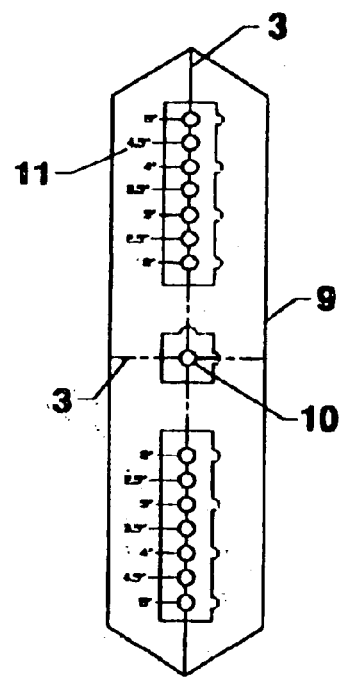
FIG. 2c is a cross-sectional view of the insert piece taken across a center line equidistant from each end of the insert piece.
Figure 2C:
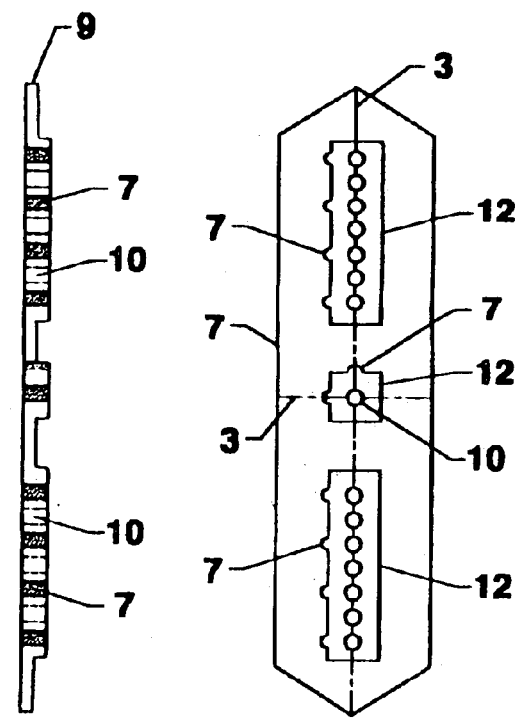
Figure 2C:
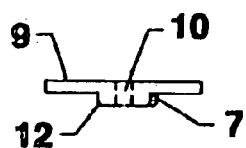

In FIG. 2, numeral 9 designates the insert piece of the jig, said insert piece being fabricated from ⅛ inch thick molded clear acrylic plastic and being about 6½ inches long. Numeral 3 designates center lines for alignment purposes. Numeral 7 designates notches. Number 10 designates ⁵⁄₃₂ inch diameter holes for scribing where the bolt holes are to be drilled, typically 15 such holes as illustrated. Numeral 11 designates calibrated center to center distant marks. Numeral 12 designates 3 "press-fit" notches longitudinally arrayed as shown in FIG. 2b, said notches having rounded edges 7 for snapping the insert piece into the central longitudinal opening of the main piece.

Figure 3:
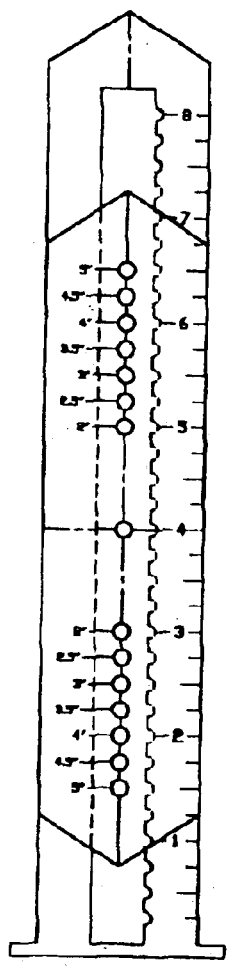
FIGS. 3, 3a and 3b show views of the insert piece used at different vertically inserted locations in the center longitudinal opening in the base piece of the jig, i.e., at or near the center of the opening and also at the farthest insertion points for the insert in the base piece.
Figure 3A:
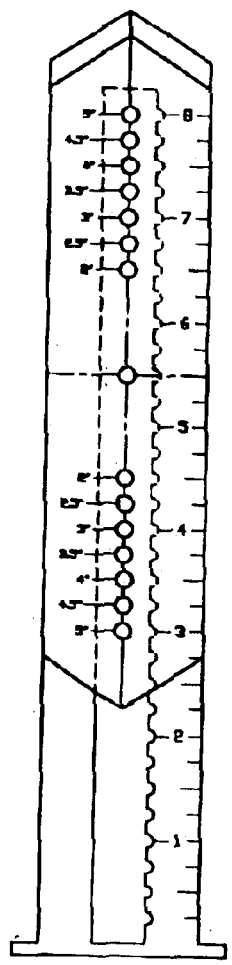
Figure 3B:
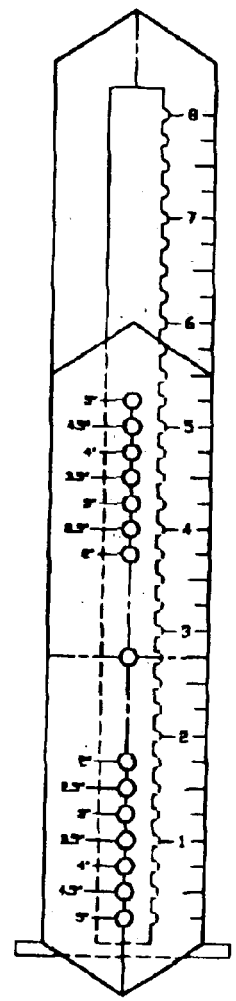

As previously stated, FIGS. 3, 3a and 3b show views of the insert piece used at different vertically inserted locations in the center longitudinal opening in the base piece of the jig, i.e., at or near the center of the opening and also at the farthest insertion points for the insert in the base piece.

Figure 4:
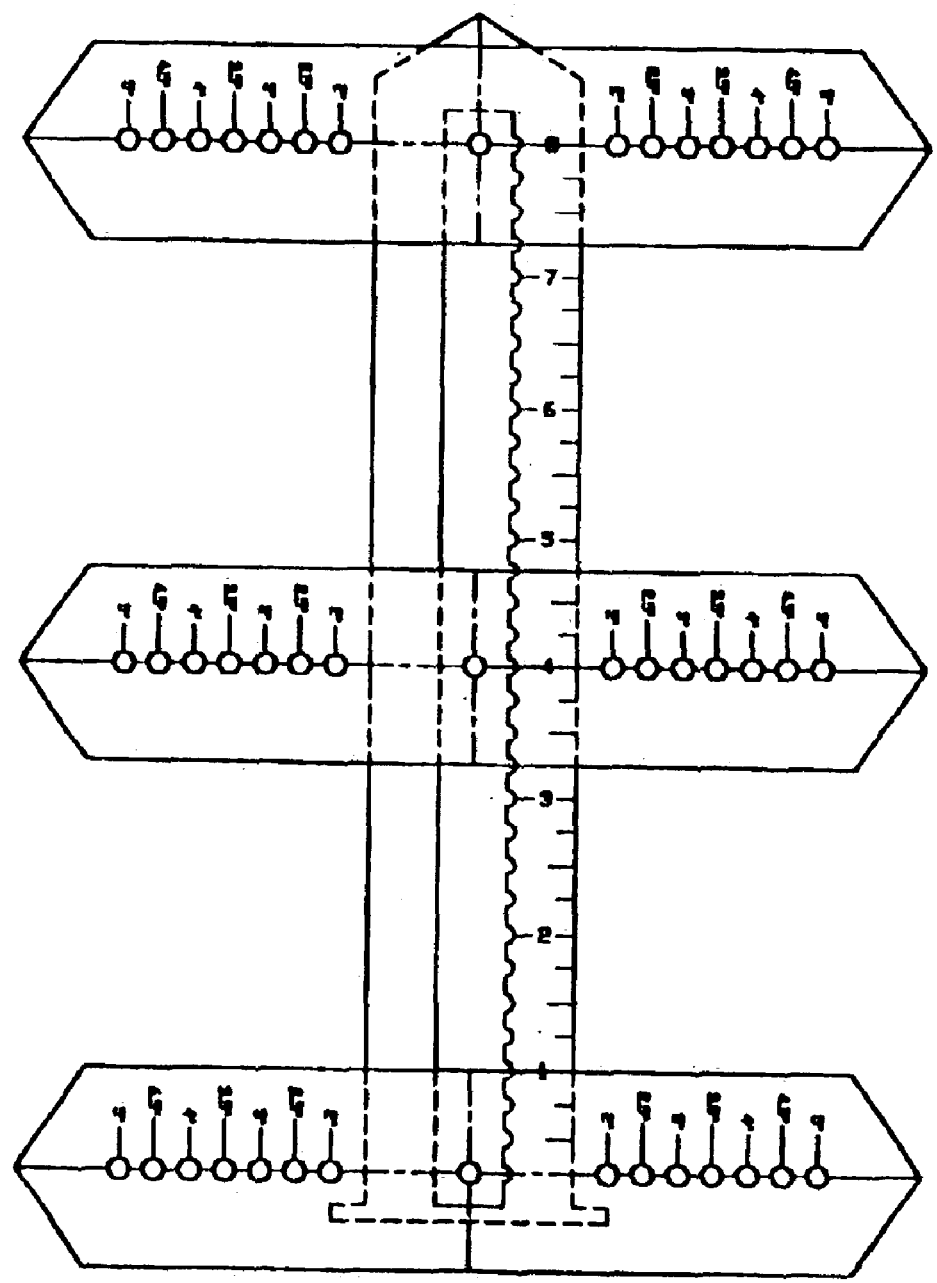
FIG. 4 shows counterpart positioning of the insert piece in the longitudinal opening in the base piece, the insert piece being horizontally inserted, rather than vertically as in FIGS. 3, 3a and 3b.

FIG. 4 shows the counterpart positioning of the insert piece in the longitudinal opening in the base piece, the insert piece being horizontally inserted, rather than vertically as in FIGS. 3, 3a and 3b.

OPERATION OF THE TEMPLATE

The insert piece is press-fitted into the central rectangular longitudinal extending opening of the main base piece, either in the same vertical direction or transverse to the main piece, depending on whether the pull handle is to be vertically or horizontally positioned on the drawer or door. The combined implement is then butted up against the edge of the door or drawer to be fitted with the handle, taking care to assure that the right angle end 2 of the main piece is flush against the edge of the door or drawer. Then scribe marks are made against the inside or outside surface of the door or drawer to be fitted with the handle to indicate where the holes are to be drilled for the threaded bolts for the pull handles. "Flushing", the right angle end 2 against the edge of the door or drawer assures the desired perfect horizontal or vertical alignment of the pull handle onto the door or drawer and making the scribed marks at the calibrated 5/32 inch holes in the insert piece assures the desired repetitive placement of the pull handles on several doors or drawers.

While the present invention has been described and illustrated in detail, various modifications may be made by those skilled in the art. It is therefore to be understood that the invention is not to be limited to the details of construction described and illustrated and it is intended by the appended claims to cover all modifications which fall within the spirit and scope of the invention.

I claim:

1. A device useful for installing pull handles on cabinet doors or drawers, said device comprising two main elements, a base piece and an insert piece, both of which are fabricated from clear transparent plastic, said base piece being about 9 inches long and about 1½ to about 1¾ inch wide with a rectangular longitudinally extending opening about 8 inches long and about ½ inch wide in its center, said base piece also having an alignment edge at one its ends and at right angle to the rest of said base piece, said edge being about 2 inches wide and about ¾ inch high, said rectangular opening in said base piece being calibrated inch wise and with about ¼ inch interval marks, and said insert piece having means on its bottom surface for snapping into tight connection in the longitudinally extending central opening of said base piece, either lengthwise in said opening or transverse-wise in said opening, and said insert piece having about fifteen, 5/32 inch uniformly spaced diameter holes in same for allowing scribing on the cabinet doors or drawers where the holes for the threaded bolts of the pull handles are to be drilled.

2. A device according to claim 1 wherein said longitudinally extending central opening of said base piece has detents at every ¼ inch space in the opening for locking the insert piece in place where desired by the installer of the pull handles.

3. A device according to claim 2 wherein the press-fit notches on the bottom surface of the insert piece have rounded edges for facilitating the ease of snapping the insert piece into the central longitudinal opening of the main piece and for easing the removal of the insert piece from the main base piece.

4. A device according to claim 1 wherein the means on the bottom surface of the insert piece for snapping into tight connection in the longitudinally extending central opening of said base piece comprise three press-fit notches longitudinally arrayed.

5. A device according to claim 1 wherein the fifteen 5/32 inch diameter holes in said insert piece consist of seven holes in each of the press-fit notches at each of the two ends of the insert piece and of one hole in the central notch of the insert piece.

6. A device according to claim 1 wherein the clear transparent plastic of the two main elements of the device are fabricated from acrylic plastic.

* * * * *